2,786,835

HYDROCORTISONE PHARMACEUTICAL COMPOSITIONS

Ellis Rex Pinson, Jr., and Gerald D. Laubach, Jackson Heights, N. Y., assignors to Chas. Pfizer & Co., Inc., Brooklyn, N. Y., a corporation of Delaware No Drawing. Application August 24, 1954, Serial No. 451,946

8 Claims. (Cl. 260—239.5)

This invention is concerned with certain compositions which are novel and of particular value for treatment of certain conditions of the human body. In particular, it is concerned with new compositions of pressor amines and acid esters of hydrocortisone which are of value as therapeutic agents, particularly for treating nasal congestion and inflammation.

A variety of agents have been proposed and used as nasal decongestants in the treatment of various conditions associated with respiratory infections and colds. Many of these have had a limited value, but often relief is only temporary and of a limited nature.

The present invention is concerned with a group of compositions of pressor amines with acid esters of hydrocortisone in which the hydrocortisone molecule is substituted at the 21-position with a polycarboxylic acid group having at least one free carboxylic acid radical. Such acid esters of hydrocortisone are described and claimed in copending patent application Serial No. 433,268, filed on May 28, 1954, by Ellis Rex Pinson, Jr. et al.

As indicated above, the compositions which are an object of the present invention are prepared from the acid esters of hydrocortisone and various pressor amines. These "pressor amines" are members of the class of therapeutic agents known as vasoconstrictors. Among amines which are useful for this purpose are ephedrine, amphetamine chemically designated as 1-phenyl-2-aminopropane, phenylephrine, epinephrine, 2-(1,2,3,4-tetrahydronaphthyl)-imidazoline, 2-aminoheptane, 2-(1-indanyl)-imidazoline, and a variety of other such compounds well known in the field of pharmaceutical chemistry. Particularly useful are those which have a minimum effect upon the central nervous system and heart. This is a property which is readily determined and the preferable pressor amines may be readily selected.

The amine-carboxylic acid compositions which are an object of this invention may be prepared simply by mixing the desired carboxylic acid ester of hydrocortisone with the chosen pressor amine. Upon addition of the mixture or the individual components of the composition to a suitable liquid medium, salt formation between the acid and base will result. The extent of such reaction will depend upon the proportion of the two components and the nature of the medium. In general, from about one mole of pressor amine to about five moles may be combined with from five to one moles of hydrocortisone ester. If it is desired to convert the materials completely to the salts, this may be done. For instance, equimolecular proportions of the two compounds may be contacted in water or in a solvent such as a lower (one to four carbon) alcohol (e. g. methanol, ethanol, isopropanol), ketone, or halogenated hydrocarbon (e. g. chloroform, carbon tetrachloride, trichloroethylene) (e. g. acetone, methyl ethyl ketone). The salt that is formed either separates or may be recovered by removal of the solvent, for instance, by evaporation. In general, it is advisable to use approximately equimolecular proportions in preparing the salts. However, the use of an excess of either one of the materials in the form of one of its simple salts (e. g. the sodium salt of a 21-acid ester of hydrocortisone or the hydrochloride of a pressor amine) is not disadvantageous. If a free pressor amine and a free acid ester of hydrocortisone are used, it is preferable to use them in approximately equimolecular proportions to obtain appreciable water solubility. Salt formation solubilizes each of the materials. The salts that are formed by this reaction usually have sufficient solubility in pharmaceutically-acceptable vehicles which are used for administration of therapeutic agents to the nasal passages so that the compounds may be prepared in such vehicles for ready administration. Alternatively, a suspension may be used. In fact, it is not essential that the salt be isolated, but the compound may be prepared from the chosen amine and carboxylic acid reactants in a medium suitable for application in therapy. Aqueous solutions of the therapeutic agents are favored, but various other vehicles, such as propylene glycol or mixtures of this with water, and non-toxic alcohols (having two or three carbon atoms) diluted with water may also be used for this purpose. Rather than using the amine and the carboxylic acid ester of hydrocortisone, it is possible to use a salt of each of the components. (In fact, this is preferable if other than equimolecular proportions are used.) Thus, the sodium salt of the acid succinate of hydrocortisone may be mixed in aqueous solution with the hydrochloride of epinephrine. The by-product sodium chloride which is formed is not in any way deleterious and may either be removed or left in the reaction mixture which is then used for the preparation of a nasal decongestant composition. If such a reaction is conducted in a solvent such as absolute ethanol, the sodium chloride may be removed by filtration and the desired amine salt may be recovered by evaporation of the solvent or the alcoholic solution may be diluted with water for use. One of the distinct advantages of the compositions of this invention (and by "compositions" we include salts as well as mixtures) is the higher aqueous solubility of many of these compositions as compared to hydrocortisone or hydrocortisone acetate. The high solubility makes for more convenient administration as a therapeutic agent.

The compositions of the present invention are used as dilute solutions in various pharmaceutically-acceptable media as indicated above. The concentration of these solutions may range from 0.05 percent to about 3 percent by weight. Various other materials may be present in the solutions, including stabilizers such as sodium bisulfite or sodium formaldehyde sulfoxylate. Certain other materials which impart a pleasant ordor to the compositions may also be used. However, it should be realized that these are not essential components of the therapeutic compositions.

The compositions of the present invention are, as indicated above, of particular value for treatment of various conditions of nasal passages to assure rapid and prolonged decongestion. The compositions are also very effective in alleviating inflammation and irritation of the nasal passages which often accompany congestion associated with colds. The two components that are used in the preparation of the salts do not individually serve to give such an unusual measure of relief for such conditions, that is, there seems to be a definite coaction between the components. Furthermore, the physical properties of the salts are definitely advantageous in that many of them dissolve at suitable concentrations in media useful for administration of therapeutic agents to the nasal passages. The compositions also possess a desirable degree of stability, such that the liquid solutions of these materials may be prepared and used without undue degradation of the normally sensitive hydrocortisone compounds.

The following examples are given by way of illustration and are not to be considered as the sole embodiment of this invention. It is to be understood that protection hereof is only to be limited by the specific wording of the appended claims.

Example I

A solution of hydrocortisone 21-acid succinate (0.05 mole) in the minimum volume of absolute ethanol was mixed with a solution of 0.05 mole of 2-(1,2,3,4-tetrahydronaphthyl)-imidazoline in the minimum volume of absolute ethanol. The solvent was removed under vacuum and the crystalline salt was recovered. It was found that a 0.5 percent aqueous solution of the amine salt was particularly effective for relieving the irritation and congestion of the nasal passages attendant to a common cold.

Example II

A solution of 0.01 mole of hydrocortisone 21-acid phthalate in a small volume of isopropanol was added to a solution of 0.01 mole of ephedrine in a small volume of isopropanol. The mixture was allowed to stand overnight and the solvent was evaporated by heating on a steam bath. The crystalline salt was dried under vacuum. A 0.2 percent solution of the salt in water was prepared. It was found useful as an anti-inflammatory nasal decongestant.

Example III

A solution of 0.1 mole of phenylephrine hydrochloride in a small volume of water was treated with an equimolecular proportion of the sodium salt of hydrocortisone 21 - (3,6 - endomethylene-hexahydrophthalic acid) ester. The aqueous mixture was diluted to such an extent that a 0.2 percent by weight concentration of the amine-carboxylic acid salt was obtained. This composition was found to be an excellent nasal decongestant.

Example IV

A mixture of 1 mole of methamphetamine hydrochloride, also chemically referred to as alpha - 1 - phenyl-2-methylaminopropane hydrochloride, and 0.2 mole of the sodium salt of hydrocortisone 21-acid glutarate was prepared. When an aqueous solution was prepared with a total concentration by weight of 0.1 percent of the mixture, it was found to be an effective nasal decongestant, rapidly alleviating irritation of the nasal mucosa.

Example V

A mixture of 0.1 mole of methamphetamine hydrochloride, which as above indicated is likewise designated as alpha - 1 - phenyl - 2 - methylaminopropane hydrochloride, and 0.05 mole of the sodium salt of the 21-acid succinate of hydrocortisone was prepared. Small portions of this mixture were placed in bottles with medicine dropper caps. Addition of sufficient water to form a 0.2 percent by weight solution, yielded an unusually effective nasal decongestant.

What is claimed is:

1. A salt of a 21-hydrocarbon dicarboxylic acid ester of hydrocortisone selected from the group consisting of hydrocortisone 21-acid succinate, hydrocortisone 21-acid phthalate, hydrocortisone 21-(3,6 - endomethylene-hexahydrophthalic acid) ester, and hydrocortisone 21-acid glutarate with a pressor amine selected from the class consisting of ephedrine, 1 - phenyl - 2 - aminopropane, alpha - 1 - phenyl - 2 - methylaminopropane, phenylephrine, epinephrine, and 2-(1,2,3,4-tetrahydronaphthyl)-imidazoline.

2. A pharmaceutical composition which comprises essentially a dilute solution of a salt of a 21-hydrocarbon dicarboxylic acid ester of hydrocortisone selected from the group consisting of hydrocortisone 21-acid succinate, hydrocortisone 21-acid phthalate, hydrocortisone 21-(3,6-endomethylene-hexahydrophthalic acid) ester, and hydrocortisone 21-acid glutarate with a pressor amine selected from the class consisting of ephedrine, 1 - phenyl - 2 - aminopropane, alpha - 1 - phenyl - 2 - methylaminopropane, phenylephrine, epinephrine, and 2-(1,2,3,4-tetrahydronaphthyl)-imidazoline.

3. A process for the preparation of a pharmaceutical compound which comprises contacting in an inert liquid a 21-hydrocarbon dicarboxylic acid ester of hydrocortisone selected from the group consisting of hydrocortisone 21-acid succinate, hydrocortisone 21-acid phthalate, hydrocortisone 21 - (3,6-endomethylene-hexahydrophthalic acid) ester, and hydrocortisone 21-acid glutarate and a pressor amine selected from the class consisting of ephedrine, 1-phenyl - 2 - aminopropane, alpha - 1 - phenyl-2-methylamino-propane, phenylephrine, epinephrine, and 2-(1,2,3,4-tetrahydronaphthyl)-imidazoline.

4. A compound as claimed in claim 1 wherein the pressor amine is phenylephrine.

5. A compound as claimed in claim 1 wherein the pressor amine is 2 - (1,2,3,4-tetrahydronaphthyl)-imidazoline.

6. A compound as claimed in claim 1 wherein the hydrocortisone ester is the acid succinate.

7. A compound as claimed in claim 1 wherein the hydrocortisone ester is the acid phthalate.

8. The salt of 2-(1,2,3,4-tetrahydronaphthyl)-imidazoline and the 21-acid succinate of hydrocortisone.

References Cited in the file of this patent

Kurland: Proc. Soc. Exptl. Biol. and Med., vol. 78, October 1951, pages 28 to 31 (167–177).

Conn: Current Therapy, 1952, Saunders Co., Phila., Pa., pages 492 to 495 (particularly page 494).

Boland: J. Am. Pharm. Assn. (pract. ed.), vol. 13, No. 8, August 1952, pp. 540 to 544 (particularly p. 540) (167–77).